United States Patent
Conrow et al.

(10) Patent No.: US 7,071,956 B2
(45) Date of Patent: Jul. 4, 2006

(54) METHOD AND APPARATUS FOR IMAGE SQUARENESS CORRECTION

(75) Inventors: Brian R. Conrow, Rochester, NY (US); David M. Kerxhalli, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 1003 days.

(21) Appl. No.: 10/041,025

(22) Filed: Jan. 7, 2002

(65) Prior Publication Data

US 2003/0128401 A1    Jul. 10, 2003

(51) Int. Cl.
*G03G 15/00* (2006.01)

(52) U.S. Cl. .................... 347/116; 399/301
(58) Field of Classification Search ............... 347/116; 399/301

See application file for complete search history.

(56) References Cited

U.S. PATENT DOCUMENTS

| | | | |
|---|---|---|---|
| 5,260,725 A | 11/1993 | Hammond | |
| 5,302,973 A | 4/1994 | Costanza et al. | |
| 5,363,127 A | 11/1994 | Andrews | |
| 5,374,993 A | 12/1994 | Diehl et al. | |
| 5,412,409 A | 5/1995 | Costanza | |
| 5,493,326 A | 2/1996 | Andrews et al. | |
| 6,285,849 B1 * | 9/2001 | Shimada et al. | 399/301 |
| 6,903,758 B1 * | 6/2005 | Kerxhalli et al. | 347/116 |

* cited by examiner

*Primary Examiner*—Huan Tran
(74) *Attorney, Agent, or Firm*—Fay, Sharpe, Fagan, Minnich & McKee, LLP

(57) ABSTRACT

A method of correcting output image squareness in a laser printer system having a Raster Output Scanning (ROS) device with a pivotal mounting. The method includes printing a test pattern that includes a plurality of markers printed in a predetermined geometric arrangement and calculating a skew angle based on the measured distances, preferably using the Law of Cosines. The ROS device is then automatically rotated by an amount sufficient to correct the skew angle. The ROS rotation is performed automatically by an adjustment system connected to the ROS. The method optionally includes a scanner for scanning the test pattern image and making the measurements automatically via a program configured to analyze the scanned image.

20 Claims, 3 Drawing Sheets

METHOD AND APPARATUS FOR IMAGE SQUARENESS CORRECTION

BACKGROUND OF THE INVENTION

Printing systems utilizing a Raster Output Scanning (ROS) device to form images on a photoreceptor surface are well known in the art. Conventionally, the ROS includes a diode or gas laser for generating a coherent beam of radiation, a modulator for modulating the laser output in accordance with an input video image signal, and a multifaceted polygon scanner for scanning the modulated laser beam output line by line across the surface of the photoreceptor to form the latent image. Also included in the ROS are various optical components to collimate, expand, focus, and align the modulated scanning beams. These optical components are fixedly mounted within a housing frame, which is positioned within a printer machine frame, so that the modulated and shaped scanning beams emerging from a window in the housing are directed perpendicular to the photoreceptor surface to form scan lines. The lines will be formed in parallel across the surface of the photoreceptor belt. The belt should be aligned so that these parallel lines are formed perpendicular to the direction of belt travel. It is difficult to achieve this perpendicularity, resulting in a condition referred to as "scan line skew" causing a squareness error, wherein the image effectively takes the form of a parallelogram. This condition will affect the images which are subsequently developed and transferred to output prints, the output prints exhibiting degradation of quality due to the skew effects.

In the past, the ROS would be adjusted manually until the squareness error was eliminated, however, newer systems provide stepper motor driven ROS de-skew mechanisms. For example, in U.S. Pat. No. 5,374,993 an adjustment example is provided that requires a multi-step procedure of printing a test pattern, determining a registration edge skew introduced by the paper feed path, determining a lead edge skew, subtracting the registration edge skew from the lead edge skew to determine the scan line skew, loosening a clamp securing the ROS housing, determining the number of hex flat increments required to correct the scan line skew from a table, turning an adjustment screw by the indicated number of hex screw flat increments, and re-tightening the clamp securing the ROS housing.

SUMMARY OF THE INVENTION

A method of correcting output image squareness in a laser printer system having a Raster Output Scanning (ROS) device with a pivotal mounting is provided. The method includes printing a test pattern that includes at least three markers such as crosshairs positioned in a predetermined geometric arrangement, measuring a plurality of distances between markers and calculating a skew angle based on the measured distances. In a preferred embodiment, the markers are printed in a rectangular arrangement and the skew angle is calculated using the Law of Cosines. The ROS device is then automatically rotated by an amount sufficient to correct the skew angle. The ROS rotation is performed automatically by an adjustment system connected to the ROS. The method optionally includes a scanner for scanning the test pattern image and making the measurements automatically via a program configured to analyze the scanned image.

DETAILED DESCRIPTION OF THE PREFERRED EMBODIMENT

Figure 1:
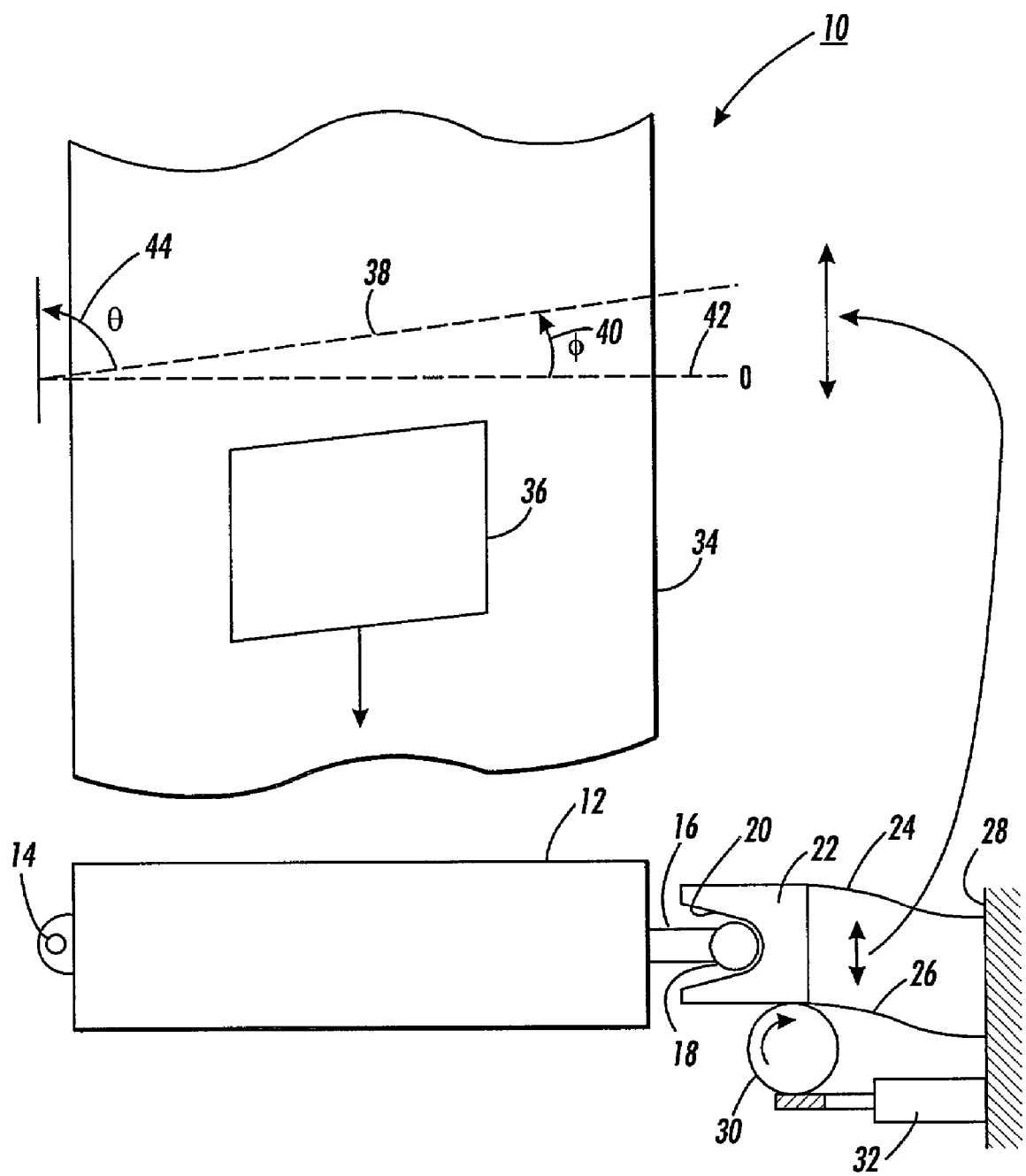
FIG. 1 is a representation of a ROS housing adjustably seated over a photoreceptor belt.

Referring to FIG. 1, there is shown an exemplary representation of a printer section 10 of a laser based printing system having an adjustable ROS housing 12 pivotally mounted at a pivot point 14 and having a ROS arm 16 and ROS ball 18 on the side opposite to the pivot point 14. The ROS ball 18 docks in a notch 20 in a solid block 22. A pair of flexible springs 24 and 26, formed in the shape of a flat ribbon, are fixedly mounted to the solid block 22 and to a frame surface 28. As viewed in FIG. 1, only the edges of the springs 24 and 26 are visible. The springs 24 and 26 hold the block 22 against a cam 30 so that the cam 30 can rotate the ROS housing 12 about the pivot point 14. The solid block 22, flexible springs 24 and 26, cam 30 and a stepper motor 32 form an adjustment system wherein the cam 30 is driven by the stepper motor 32 so that the process of rotating the ROS housing 12 can be automated electronically.

It is to be appreciated that other arrangements and devices can be utilized for automating adjustment of the ROS housing 12 electronically, and that these other devices and arrangements fall within the scope of the present invention.

As viewed from the perspective of FIG. 1, ROS housing 12 is positioned above a photoreceptor belt 34, and the ROS housing may include a laser, modulator, polygon scanner, and other optical elements required to focus and direct output beams which are in turn scanned across the moving photoreceptor belt 34. Image lines are exposed at the photoreceptor belt 34 with each scan to create a latent electrostatographic image 36 of the document being imaged. The latent image 36 can then be developed and transferred to a copy sheet with the transferred image being fused. This process is well known to persons of average skill in the art. If the photoreceptor belt 34 is skewed in the process direction, however, the scanned line 38 will not be perpendicular to the belt edges or parallel to the lead edge of the images in the process direction. The scan line 38 will vary from the desired perpendicular direction by a skew angle 40, referred to hereinafter as angle $\phi$. The resulting output prints will exhibit copy quality defects resulting from the scan line skew.

According to the present invention, the ROS housing 12 is mounted within printer section 10 in such a way as to enable adjustment of the housing components to compensate for the housing-to-belt skew angle $\phi$.

As previously described, ROS housing 12 is pivotally mounted at a pivot point 14 and having a ROS arm 16 and ROS ball 18 on the side opposite to the pivot point 14. The ROS ball 18 docks in a notch 20 in a solid block 22. A pair of flexible springs 24 and 26, formed in the shape of a flat ribbon, are fixedly mounted to the solid block 22 and to a frame surface 28. The block 22 is, therefore, held in contact with the cam 30 which can rotate the ROS housing 12 about the pivot point 14 by moving the block 22 in the desired direction to reduce skew angle φ. For example, in one embodiment, the cam 30 can be configured so that rotating the cam in a clockwise direction from an initial position will cause ROS housing 12 to rotate in a counterclockwise direction, thereby numerically increasing skew angle φ, wherein a preferred value of zero is represented by a dashed line 42. Similarly, rotating the cam in a counterclockwise direction from an initial position will cause ROS housing 12 to rotate in a clockwise direction, thereby numerically reducing skew angle φ.

In prior art environments, the ROS would be manually adjusted until the squareness error, skew angle φ, was eliminated. In the present embodiment, however, with a stepper motor driven ROS de-skew mechanism, the adjustment of the ROS angle 44, hereinafter referred to as ROS angle θ, is automated. A system and process is therefore described herein for determining the skew angle φ utilizing measured linear distances, and using those measurements as input for adjusting the ROS angle (θ) 44 to a preferred value of 90 degrees by reducing the magnitude of skew angle φ to substantially zero. In the embodiment described herein, three linear distances are utilized, however, other embodiments may use as few as two linear distances.

Figure 2:
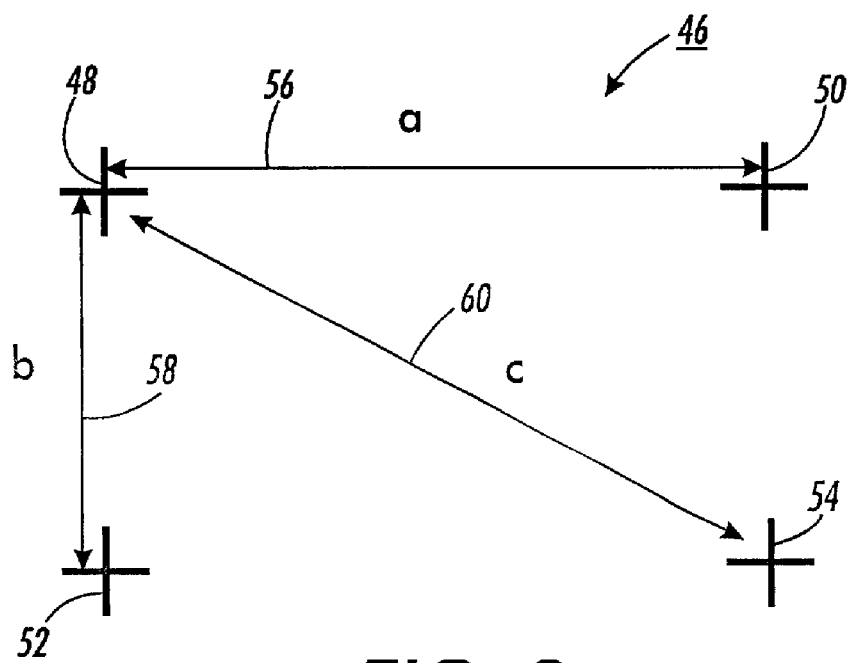
FIG. 2 shows a test pattern print output used to determine scan line skew.

A first step in measuring skew angle φ is to print a test pattern of markers, such as cross hatches for example. FIG. 2 shows a test pattern 46 suitable for use in the present embodiment. Cross hatches 48, 50, 52 and 54 are printed such that they form the four corners of a rectangle. Rather than measuring the skew angle φ, or the complementary ROS angle θ, directly, it is more convenient and accurate to measure the distances between three pairs of the cross hatches as illustrated. The measured distances are labeled a (56), b (58) and c (60) in FIG. 2. Distance 56 represents a horizontal distance, distance 58 represents a vertical distance, and distance 60 represents a diagonal distance.

Figure 3:
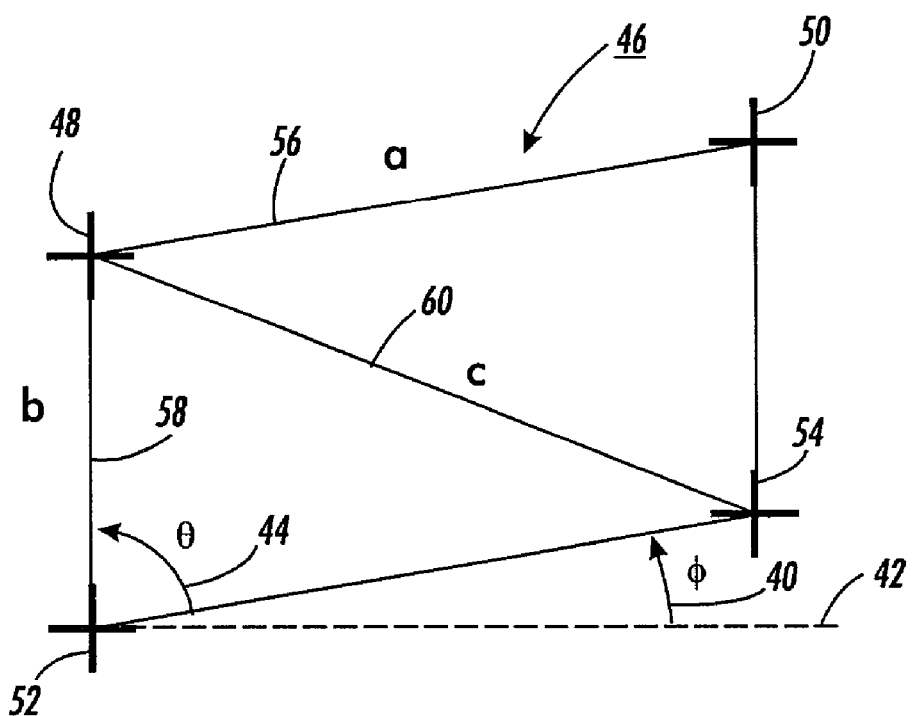
FIG. 3 shows a skewed test print output and measurements.

Referring now to FIG. 3 which shows an exemplary printed test pattern having a nonzero skew angle φ, and with continuing reference to FIGS. 1 and 2, a procedure of determining ROS angle θ and skew angle φ is now described. Since ROS skew does not affect the angle of the line connecting the leftmost two crosshairs 48, 52 (distance b), it follows that φ=π/2−θ. Using the Law of Cosines, θ can be solved for with $$\theta = \cos^{-1}\left(\frac{a^2 + b^2 - c^2}{2ab}\right) \quad (1)$$

and hence $$\phi = \frac{\pi}{2} - \cos^{-1}\left(\frac{a^2 + b^2 - c^2}{2ab}\right) \text{ or} \quad (2)$$

$$\phi = \sin^{-1}\left(\frac{a^2 + b^2 - c^2}{2ab}\right) \quad (3)$$

thus providing the desired measurement of skew angle φ (40).

Figure 4:
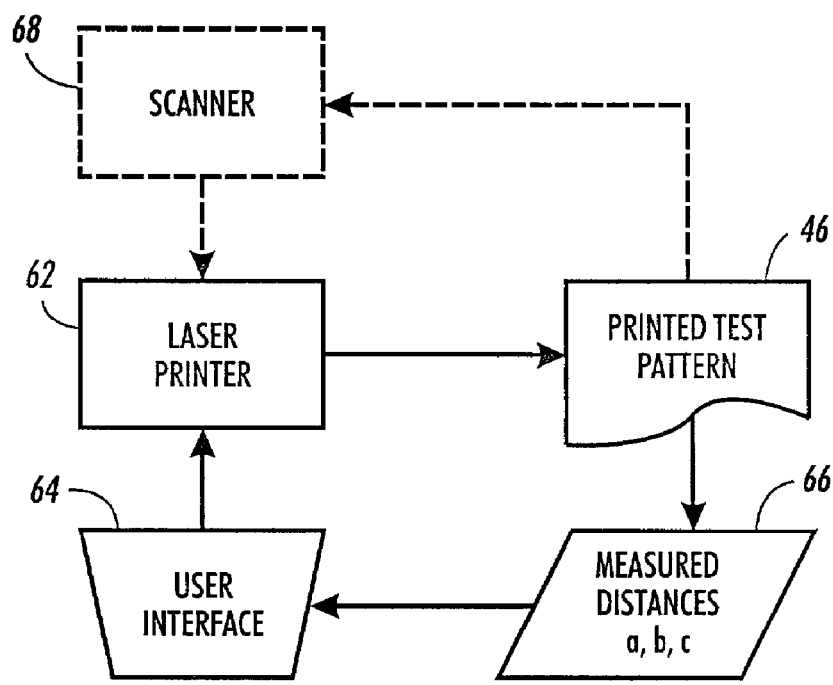
FIG. 4 depicts correction of ROS skew during registration setup of a laser printer system.

The correction of ROS skew during registration setup of a laser printer system is depicted in FIG. 4. A laser printer system 62, having ROS housing 12 configured as shown in FIG. 1, and having a user interface 64, is shown. A user via user interface 64 has printer system 62 print a test pattern 46 as a printed output. After the test pattern is printed, the user measures the distances labeled a, b and c (56, 58 and 60) according to the pattern shown in FIG. 3. The user then inputs the distances a, b and c (66) into the user interface 64, and the printer system 62 then, using Equation 3 above, calculates skew angle φ (40). The printer system 62 then operates stepper motor 32 under control of a program configured to control the stepper motor in order to rotate the cam 30 in a direction and angular displacement sufficient to reduce the magnitude of skew angle φ to substantially zero. This requires advance knowledge of the relationship between the number of micro-steps of rotation of the stepper motor and the corresponding change in the ROS angle. For example, assume the relationship for a given system is a clockwise skew angle change of $2 \times 10^{-5}$ degrees per micro-step of clockwise stepper motor rotation. If the measured skew angle φ is equal to $2 \times 10^{-2}$ degrees (CCW), the stepper motor would need to rotate 1,000 micro-steps (CW). The exemplary relationship can be expressed as:

# of micro-steps=# of micro-steps/change in skew angle*skew angle error.

This particular motor/skew angle relationship is meant to serve as an example only. Other position-control mechanisms may be substituted for the stepper motor used in this example.

In an alternative embodiment, a scanner 68 is provided to scan the printed test pattern 46 as shown by the dashed lines. Instead of a user manually measuring the distances and entering measured a, b and c distances via the user interface 64, the printed test pattern 46 is entered into the scanner 68 which scans the printed test pattern and inputs the scanned test pattern into printer 62 which is configured with a program to automatically calculate distances a, b and c, and then to rotate the cam 30 in a direction and angular displacement sufficient to reduce the magnitude of skew angle φ to substantially zero.

The procedure depicted in FIG. 4 can eliminate skew error in a single step, however, the procedure may be repeated one or more times to confirm correct angular positioning of the ROS housing 12. It is also to be appreciated that, in the above-described process and an alternative process described below, the method of measuring and correcting scan line skew is independent of any registration edge skew produced by the paper feed mechanism. In the past, such as in the aforementioned U.S. Pat. No. 5,374,993, it was necessary to subtract the registration edge skew from a lead edge skew to arrive at the scan line skew.

An exemplary test pattern measurement and calculation of skew angle φ is provided here to demonstrate the use of Equation 3:
a=8 in.,
b=6 in.,
c=9.95 in. and
φ=0.595 degrees.

Another exemplary test pattern measurement and calculation of skew angle φ is provided here to demonstrate an adjustment in a direction opposite to that of the first example wherein the resultant angle is negative in value:
a=8 in.,
b=6 in.,
c=10.05 in. and
φ=−0.598 degrees.

After printer system 62 adjusts the angular position of the ROS housing 12 for either of the two examples above, the preferred results of a second test would yield:

a=8 in.,
b=6 in.,
c=10 in. and
φ=0 degrees.

Figure 5:
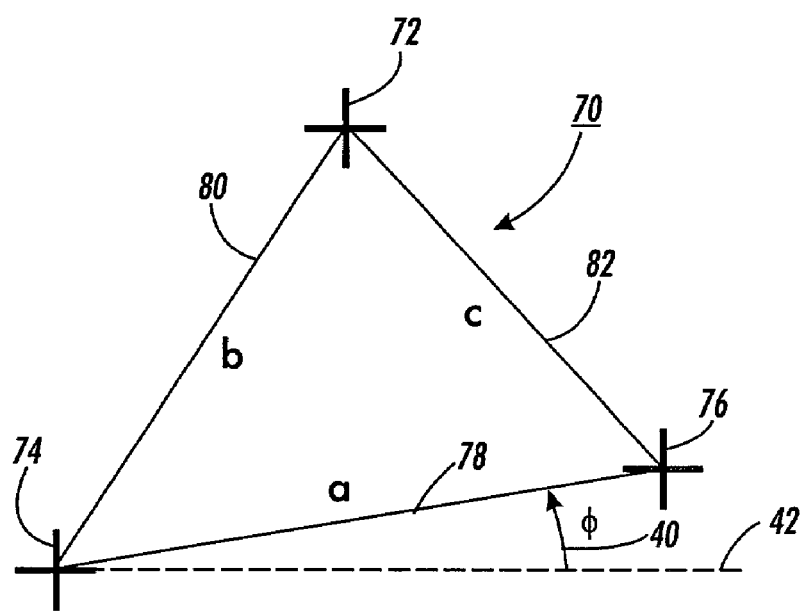
FIG. 5 shows an alternate skewed test print output and measurements.

While the embodiment described above utilizes a test pattern 46 having four rectangularly positioned crosshatches, it is to be understood that other known predetermined geometric shapes may be used requiring as few as two distance measurements. For example, FIG. 5 shows a test pattern 70 having three crosshatches 72, 74 and 76 printed in the arrangement of an isosceles triangle. In this exemplary case, any two of distances labeled a, b and c (78, 80, 82) are measured. These distances respectively represent the measured lengths of the base, left and right legs of the skewed isosceles triangle 70. The scan line skew is given by any one of the following equations depending on the choice of distances measured:

$$\phi = \sin^{-1}\left[\left(\frac{b^2}{a^2} - 1\right)\left(\frac{1}{\cos 30°}\right)\right] \quad (4)$$

$$\phi = \sin^{-1}\left[\left(1 - \frac{c^2}{a^2}\right)\left(\frac{1}{\cos 30°}\right)\right] \quad (5)$$

$$\phi = \sin^{-1}\left[\left(\frac{b^2 - c^2}{b^2 + c^2}\right)\left(\frac{1}{\cos 30°}\right)\right] \quad (6)$$

where φ represents skew angle 40 as shown.

Exemplary test pattern measurements representing positive and negative values of skew angle φ are provided here to demonstrate the use of Equation 4:
a=6 in.,
b=6.0452 in.,
c=5.9545 in.,
φ=1 degree, and
a=6 in.,
b=5.9545 in.,
c=6.0452 in.,
φ=−1 degree, where φ is calculated using any one of Equations 4, 5 or 6 utilizing the respective two of distances a, b and c.

While the invention has been described with respect to specific embodiments by way of illustration, many modifications and changes will occur to those skilled in the art. It is therefore, to be understood that the appended claims are intended to cover all such modifications and changes which fall within the true spirit and scope of the invention.

What is claimed is:

1. A method of correcting output image squareness in a laser printer system having a Raster Output Scanning (ROS) device comprising:
   (a) pivotally mounting said ROS device;
   (b) printing a test pattern including a plurality of predetermined markers;
   (c) measuring a plurality of distances between said markers;
   (d) calculating a skew angle based on the plurality of distances; and
   (g) rotating said ROS device by an amount sufficient to correct said skew angle.

2. The method of correcting output image squareness as set forth in claim 1, wherein said rotating said ROS is performed automatically by an adjustment system connected to said ROS.

3. The method of correcting output image squareness as set forth in claim 1, wherein said measuring a plurality of distances and said calculating a skew angle is independent of a registration edge skew.

4. The method of correcting output image squareness as set forth in claim 1, wherein said calculating a skew angle is performed by a first program in said laser printer system.

5. The method of correcting output image squareness as set forth in claim 1, wherein said measuring a plurality of distances is performed automatically by a second program in said laser printer system receiving a scanned image of said test pattern from a scanner attached to said laser printer system.

6. The method of correcting output image squareness as set forth in claim 1, wherein said plurality of predetermined markers comprise at least three rectangularly positioned markers.

7. The method of correcting output image squareness as set forth in claim 6, wherein said measuring a plurality of distances between said markers comprises:
   (a) measuring a horizontal distance between two of said markers;
   (b) measuring a vertical distance between two of said markers; and
   (c) measuring a diagonal distance between two of said markers.

8. The method of correcting output image squareness as set forth in claim 7, wherein said calculating a skew angle utilizes the Law of Cosines.

9. The method of correcting output image squareness as set forth in claim 1, wherein said plurality of predetermined markers comprise at least three markers arranged in the form of an isosceles triangle.

10. The method of correcting output image squareness as set forth in claim 9, wherein said measuring a plurality of distances between said markers comprises measuring at least two legs of said isosceles triangle.

11. In a laser printer system, a skew angle measurement and adjusting system comprising:
   a pivotally mounted ROS device;
   a skew measurement system configured to calculate the skew angle based on a plurality of measured distances between a plurality of printed markers arranged in a predetermined configuration; and
   a skew adjustment system configured to adjust the skew angle of the pivotally mounted ROS device based on the calculated skew angle.

12. The system as set forth in claim 11, wherein the skew measurement system is configured to determine said skew angle by the Law of Cosines from a measurement of a horizontal distance between printed markers, a measurement of a vertical distance between printed markers and a measurement of a diagonal distance between printed markers, wherein said markers are printed in a rectangular arrangement.

13. The system as set forth in claim 11, wherein the skew measurement system is configured to determine said skew angle by a measurement of two or more legs of a triangle, and wherein said markers are printed in an arrangement forming the triangle.

14. The system as set forth in claim 13, wherein said triangle is an isosceles triangle.

15. A laser printing system comprising:
(a) a user interface; and
(b) a laser printer including:
  (i) a photoreceptor belt;
  (ii) a pivotally mounted ROS device;
  (iii) an automatic adjustment system for correcting a skew angle of said ROS device;
  (iv) a first program configured to calculate said skew angle from a plurality of distances of a predetermined test pattern printed as an output image, wherein said plurality of distances are received from said user interface; and
  (v) a second program configured to adjust said skew angle of said pivotally mounted ROS device utilizing said automatic adjustment system.

16. The laser printer system of claim 15, wherein said automatic adjustment system includes:
  (a) a block having a notch configured to receive a ROS ball attached to a side of said ROS device opposite a pivotally mounted side of said ROS device;
  (b) a cam configured to maintain contact with a side of said block and configured to move said block in a direction substantially parallel to a direction of travel of said photoreceptor belt, when said cam is rotated; and
  (c) a stepper motor configured to rotate said cam wherein said stepper motor is controlled by said program configured to adjust said skew angle of said pivotally mounted ROS device utilizing said automatic adjustment system.

17. The laser printer of claim 15, wherein said test pattern comprises at least three rectangularly positioned markers.

18. The laser printer of claim 17, wherein said plurality of distances comprise:
  (a) a horizontal distance between two of said markers;
  (b) a vertical distance between two of said markers; and
  (c) a diagonal distance between two of said markers.

19. The laser printer of claim 18, wherein said program is configured to calculate said skew angle calculates said skew angle using the Law of Cosines.

20. The laser printer system of claim 15 further including:
  (a) a scanner; and
  (b) a third program configured to receive a scanned test pattern image from said scanner and to calculate plurality of distances from said test pattern image, wherein plurality of distances are received by said first program from said third program.

* * * * *